(12) United States Patent
Ricci (10) Patent No.: US 12,434,001 B2
(45) Date of Patent: Oct. 7, 2025

(54) CAP FOR PRE-FILLED SYRINGE WITH LUER-LOCK CONNECTOR

(71) Applicant: PLATINUM PHARMA SERVICE S.R.L.S., Citta' Sant'Angelo (IT)

(72) Inventor: Alfredo Ricci, Citta'Sant'Angelo (IT)

(73) Assignee: PLATINUM PHARMA SERVICE S.R.L.S., Citta' Sant'Angelo (IT)

( * ) Notice: Subject to any disclaimer, the term of this patent is extended or adjusted under 35 U.S.C. 154(b) by 738 days.

(21) Appl. No.: 17/773,198

(22) PCT Filed: Oct. 30, 2020

(86) PCT No.: PCT/IB2020/060197
§ 371 (c)(1),
(2) Date: Apr. 29, 2022

(87) PCT Pub. No.: WO2021/084489
PCT Pub. Date: May 6, 2021

(65) Prior Publication Data
US 2022/0370719 A1    Nov. 24, 2022

(30) Foreign Application Priority Data
Oct. 31, 2019  (IT) ................. 102019000020170

(51) Int. Cl.
*A61M 5/31*    (2006.01)

(52) U.S. Cl.
CPC ....... *A61M 5/31* (2013.01); *A61M 2005/3104* (2013.01)

(58) Field of Classification Search
CPC ........... A61M 5/31; A61M 2005/3103; A61M 2005/3104; A61M 2005/3123
See application file for complete search history.

(56) References Cited

U.S. PATENT DOCUMENTS

| | | | |
|---|---|---|---|
| 6,027,482 A * | 2/2000 | Imbert | A61M 5/344 604/534 |
| 9,192,449 B2 * | 11/2015 | Kerr | A61M 39/20 |
| 2018/0214684 A1 | 8/2018 | Avula et al. | |

FOREIGN PATENT DOCUMENTS

WO    2011125475 A1    10/2011

OTHER PUBLICATIONS

International Search Report and Written Opinion issued on Dec. 9, 2020 in corresponding International Patent Application No. PCT/IB2020/060197; 8 pages.

* cited by examiner

*Primary Examiner* — Dung T Ulsh
(74) *Attorney, Agent, or Firm* — Maier & Maier, PLLC (57) ABSTRACT

A cap for a pre-filled syringe with a Luer-lock connector including a main body provided with a first handle portion and a second portion designed to be coupled to the Luer-lock connector, an axial cavity having an aperture at the second coupling portion formed in the main body; and a rubber housed within the axial cavity of said main body. The cap also includes a tapered portion, which is interposed between the first handle portion and the second coupling portion and is designed to air-tightly engage the Luer-lock connector, and the rubber has a surface facing the aperture of the axial cavity, the surface being designed to abut against an open free end of a tip of the pre-filled syringe for air-tightly closing the open free end.

12 Claims, 5 Drawing Sheets

CAP FOR PRE-FILLED SYRINGE WITH LUER-LOCK CONNECTOR

TECHNICAL FIELD

The present invention generally relates to the technical field of pre-filled syringes. More particularly, the present invention relates to a cap with air-tight and unintentional anti-unscrewing closure for a pre-filled syringe with Luer-lock connector. The invention also relates to a pre-filled syringe with a Luer-lock connector provided with such a cap.

BACKGROUND

Pre-filled or disposable syringes are widely used to inject medicinal in a person products such as, among others, anticoagulants, for example heparin and the like, vaccines, small sized molecules, and cosmetic products, for example hyaluronic acid.

They represent a growing market, as they make it possible to effectively reduce errors in the dosage of a product to be injected and help to reduce packaging costs.

A pre-filled syringe typically comprises a transparent cylindrical body, on which the measurement notches are indicated, a plunger sliding inside the transparent cylindrical body and a hollow and frusto-conical tip, extending from the transparent cylindrical body and onto which a needle, it also being hollow, is then fitted through which the injected or aspirated product passes. The plunger is provided, at one of the ends thereof, with a rubber ring or capsule to ensure the controlled and constant sliding of the plunger inside the transparent cylindrical body. The tip of the syringe is typically provided with a Luer-lock connector, i.e. a screwing system that locks the needle connector to prevent the unintentional removal thereof. Finally, the pre-filled syringe is provided with a closure cap, whose function is to prevent the product contained in the syringe from leaking.

A pre-filled syringe must guarantee the sterility of the product contained therein for several years, typically up to five years, i.e. it must prevent the product contained therein from coming into contact with the air. In fact, if air enters the pre-filled syringe, the product inside it could undergo such deteriorations as to compromise the effectiveness thereof.

The entry of air into a pre-filled syringe typically occurs following repeated thermal cycles and/or unintentional impacts, which phenomena might cause the partial or total separation of the cap from the syringe. The entry of air into the pre-filled syringe might also occur during the syringe sterilization process or in the centrifugation phase, during which a pressure decrease is generated in the syringe that favours the entry of air.

The closure caps for the pre-filled syringes with a Luer-lock connector must therefore have sealing properties, i.e. ensure air-tightness, and anti-unscrewing, i.e. be configured so as not to separate unintentionally and in an unwanted manner from the syringe, when the syringe is not used, typically during syringe storage.

Figure 2:
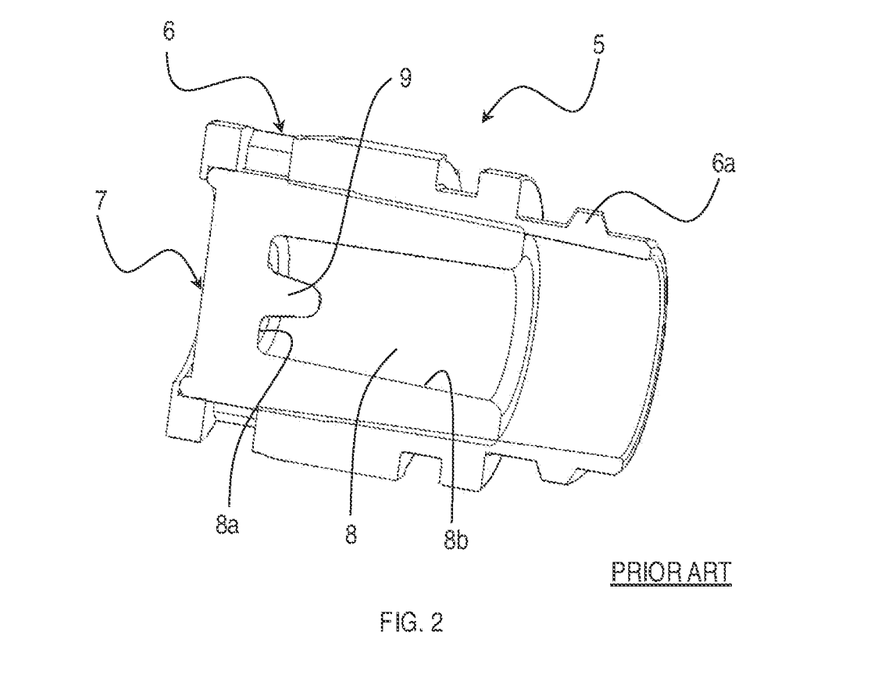
FIG. 2 is a perspective view and in longitudinal section of a cap for pre-filled syringe with a Luer-lock connector according to the prior art.

A closure cap for pre-filled syringe with a Luer-lock connector of known type comprises a rigid and relatively non-deformable, portion for handling and matching with the Luer-lock connector, and a softer and hollow portion, typically made of rubber, which is housed within the rigid portion and is designed to come into contact, wrapping it, with the frusto-conical tip of the syringe. Such a known cap is illustrated in FIG. 2.

The known cap briefly described above presents some drawbacks.

Firstly, this cap, even if correctly positioned at the tip and at the Luer-lock connector of the syringe, does not guarantee a sufficient sealing and unintentional anti-unscrewing action, as the contact force between the rubber portion and the tip of the syringe is distributed over a surface, namely the frusto-conical outer side surface of the tip, which is relatively extended. The soft rubber portion of the cap therefore exerts a relatively low pressure on the outer side surface of the tip, with consequent possibility of air entering the pre-filled syringe and simultaneous reduction of the anti-unscrewing effect exerted by the cap at the Luer-lock connector, under storage conditions of the pre-filled syringe. This anti-unscrewing effect is in fact due to the frictional forces generated between the outer frusto-conical surface of the syringe tip and the soft rubber portion of the cap.

Secondly, when mounting the cap onto the tip of the pre-filled syringe, air can remain trapped between the soft rubber portion of the cap and the tip of the pre-filled syringe, which trapped air is inevitably forced into the pre-filled syringe, as the soft rubber portion is placed on the pre-filled syringe.

Furthermore, in the step of inserting the cap on the pre-filled syringe, a sliding action of the cap is generated on the outer side surface of the tip. This sliding, in addition to being annoying for the operator, can cause the generation of unwanted microparticles that might contaminate the product contained in the syringe.

Finally, the closure caps for pre-filled syringes of the known type are difficult to assemble for the manufacturer and have a relatively high cost.

SUMMARY

The main object of the present invention is therefore to provide a cap for pre-filled syringe with a Luer-lock connector capable of overcoming the drawbacks mentioned above with reference to caps for syringes of the known type.

More specifically, the main object of the present invention is to provide a cap for a pre-filled syringe with a Luer-lock connector configured in such a way as to significantly increase the sealing and unintentional anti-unscrewing properties thereof, so as to ensure a perfect preservation of the product contained in the syringe, at least for a period of five years.

Yet another object of the present invention is to provide a cap for a pre-filled syringe with a Luer-lock connector configured to facilitate the screwing operation onto the syringe, as well as the unscrewing operation when the syringe is to be used to inject the product it contains.

Not the least object of the present invention is to provide a cap for a pre-filled syringe with Luer-lock connector, which can be produced in times and at costs lower than those for producing traditional caps.

These and other objects, which will become clearer in the following of the present description, are achieved by a cap for a pre-filled syringe with a Luer-lock connector and by a pre-filled syringe.

The invention therefore relates, in a first aspect thereof, to a cap for a pre-filled syringe with a Luer-lock connector comprising a main body provided with a first handle portion and a second portion designed to be coupled to the Luer-lock connector, an axial cavity having an aperture at the second coupling portion being formed in said main body; and a rubber housed within the axial cavity of the main body.

The cap is characterized in that it comprises a tapered portion, which is interposed between the first handle portion and the second coupling portion and is designed to air-tightly engage the Luer-lock connector and in that the rubber has a surface facing the aperture of the axial cavity and said surface being designed to abut against an open free end of a tip of the pre-filled syringe for air-tightly closing the open free end.

In a second aspect thereof, the invention relates to a pre-filled syringe with a Luer-lock connector provided with a cap as defined above.

When the cap is mounted on the syringe, the intermediate tapered portion engages tightly the Luer-lock connector and the rubber abuts against the tip of the pre-filled syringe, suitably compressed inside the axial cavity, thus ensuring the air-tight and unintentional anti-unscrewing closure of the syringe for long periods of time.

In other words, the sealing and anti-unscrewing characteristics of the cap according to the invention are ensured by two factors, namely the frictional force generated by the intermediate tapered portion of the cap, which engages tightly on the pre-filled syringe, and the elastic reaction of the rubber. In fact, the rubber, in addition to air-tightly closing the tip of the syringe, increases, due to its elastic reaction, the frictional force between the coupling portion of the main body and the Luer-lock connector to which it is coupled.

Furthermore, the intermediate tapered portion, in addition to allowing the air-tight coupling and the anti-unscrewing between cap and pre-filled syringe, advantageously provides a mechanical abutment which guarantees the correct positioning of the cap on the syringe. This allows to keep the rubber in abutment against the tip of the pre-filled syringe and constantly compressed inside the axial cavity of the main body, so that the elastic reaction of the rubber remains in an interval such as to guarantee the anti-unscrewing effect and the sealing power of the cap. It is therefore avoided that the rubber undergoes a plastic deformation over time, which would affect the efficiency of the tight closure of the free open end of the syringe tip.

BRIEF DESCRIPTION OF THE DRAWINGS

Further characteristics and advantages of the present invention will become clearer from the following detailed description of its preferred embodiments, given below, by way of non-limiting example, with reference to the attached drawings. In the drawings.

DETAILED DESCRIPTION OF THE EMBODIMENTS

Figure 1:
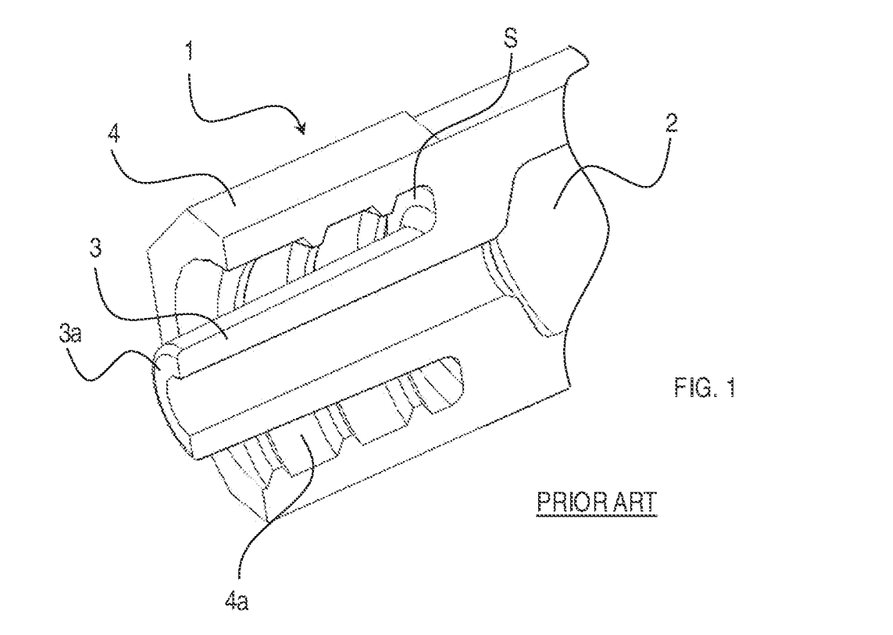
FIG. 1 is a perspective view and in longitudinal section of a detail of a pre-filled syringe with a Luer-lock connector of a known type.

With reference to FIGS. 1 and 2, they illustrate, respectively, a detail of a pre-filled syringe with a Luer-lock connector of a known type and a cap according to the prior art, designed to be mounted, for example, on the pre-filled syringe of FIG. 1.

The pre-filled syringe, generally indicated by the reference number 1, comprises a transparent cylindrical body 2, for containing a product to be injected, and a plunger (not shown) sliding inside the transparent cylindrical body 2. A hollow and substantially frusto-conical tip 3, onto which a needle is subsequently fitted for the injection of the product present in the transparent cylindrical body 2, extends from the transparent cylindrical body 2. At the tip 3 there is a Luer-lock connector 4 provided with an inner threading 4a. A space S is delimited between the Luer-lock connector 4 and the tip 3.

As described above, the cap according to the prior art, generally indicated by the reference number 5, comprises a rigid and relatively non-deformable portion 6, which is substantially cylindrical, hollow and open at the ends, which has a threaded end 6a for coupling the cap with the Luer-lock connector 4 of the pre-filled syringe 1, and a softer portion 7, it also being substantially cylindrical, which is housed within the rigid portion 6. A substantially frusto-conical seat 8, from an upper surface 8a of which a typically frusto-conical tooth 9 extends so as to have a mouth portion, is formed in the softer portion 7.

When the cap 5 is mounted on the pre-filled syringe 1, the threaded end 6a of the rigid portion 6 is screwed onto the inner threading 4a of the Luer-lock connector 4 of the syringe 1, so as to tightly close the space S (FIG. 1) comprised between the tip 3 and the Luer-lock connector 4. Correspondingly, the tip 3 of the pre-filled syringe 1 is housed within the seat 8 of the softer portion 7, wrapped by a side surface 8b of the seat 8, with the tooth 9 inserted in the tip 3 and the upper surface 8a of the seat 8 in abutment against a free end 3a (FIG. 1) of the tip 3.

Figure 3:
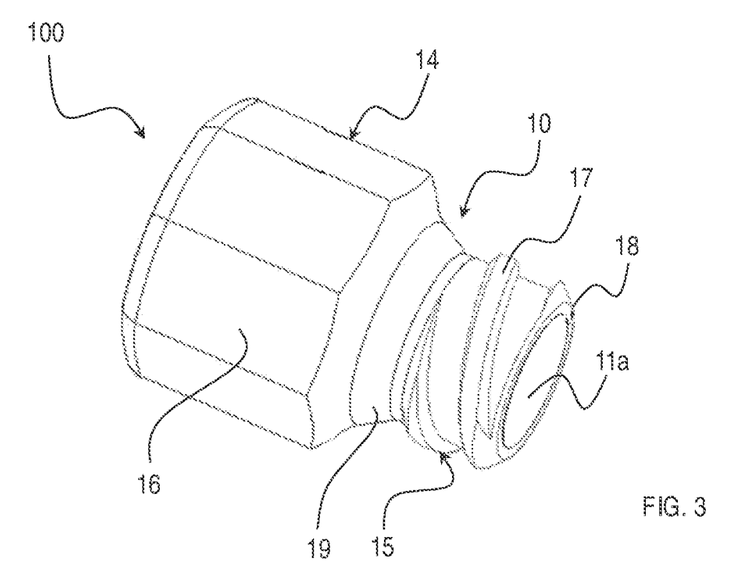
FIG. 3 is a perspective view of a cap for a pre-filled syringe with a Luer-lock connector according to a preferred embodiment of the present invention.
Figure 4:
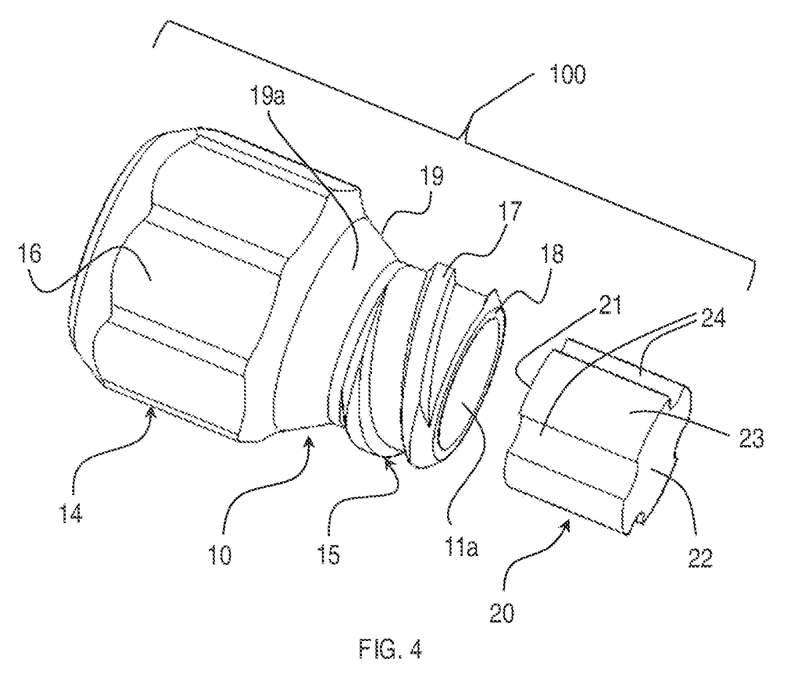
FIG. 4 is an exploded perspective view of the cap of FIG. 3.
Figure 5:
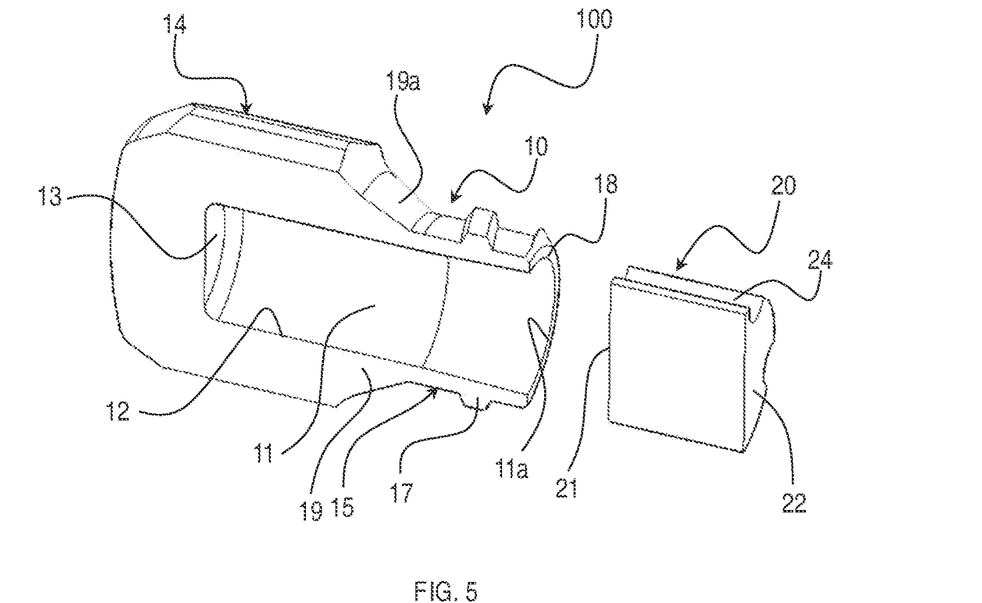
FIG. 5 is a perspective view, exploded and in longitudinal section, of the cap of FIG. 3.

With reference to FIGS. 3 to 5, a cap for a pre-filled syringe with a Luer-lock connector according to a preferred embodiment of the present invention is illustrated.

The cap, generally indicated by the reference number 100, comprises a main body 10, substantially cylindrical, including a first handle portion 14 for the cap 100 and a second portion 15 for coupling the cap 100 with the pre-filled syringe with a Luer-lock connector 1.

The first handle portion 14 preferably has a faceted outer surface 16 to facilitate the gripping of the cap 100 by a user in the step of screwing/unscrewing the cap 100 onto/from the pre-filled syringe 1.

The second coupling portion 15 has an outer diameter smaller than the outer diameter of the first handle portion 14 and has an outer threading 17 for matching with the inner threading 4a of the Luer-lock connector 4 of the pre-filled syringe 1. The second coupling portion 15 also has a conical mouth 18 at a free end thereof, which advantageously facilitates the insertion of the cap 100 into the space S comprised between the tip 3 and the Luer-lock connector 4 of the pre-filled syringe 1. The conical mouth 18 preferably has a length comprised between about 3.5 mm and about 4 mm. As clearly visible in FIG. 5, an axial cavity 11, it being also substantially cylindrical, having an aperture 11a at the second coupling portion 15 is formed in the main body 10. The axial cylindrical cavity 11 also has a side surface 12 and a bottom surface 13, preferably flat.

Preferably, the axial cylindrical cavity 11 has a diameter comprised between about 3.7 mm and about 6.35 mm and a depth greater than about 5.4 mm.

The main body 10 is made of rigid and non-deformable material, for example compact polycarbonate (Makrolon®), and the flat bottom surface 13 of the axial cylindrical cavity 11 is also rigid and non-deformable.

The main body 10 also has a tapered portion 19, which is interposed between the first handle portion 14 and the second coupling portion 15.

As previously mentioned, preferably the first handle portion 14 has an outer diameter greater than that of the second coupling portion 15, the tapered portion 19 thus joining together the first handle portion 14 and the second coupling portion 15.

In the embodiment illustrated in the Figures, the tapered portion 19 is frusto-conical with a linear or curved outer wall 19a.

The cap 100 also comprises a rubber 20, which is housed within the axial cylindrical cavity 11 of the main body 10.

The rubber 20 is substantially cylindrical in shape and has a surface 21, a surface 22, opposite to the surface 21 and facing the aperture 11a of the axial cavity 11, and a side surface 23.

The surface 22 facing the aperture 11a of the axial cavity 11 is a flat surface, whereas a series of longitudinal grooves 24 is preferably formed at the side surface 23, which allow the user to deform the rubber 20 to advantageously facilitate the insertion thereof into the axial cylindrical cavity 11 of the main body 10, during the assembly step of the cap 100. The longitudinal grooves 24 also advantageously allow air to come out during the insertion of the rubber 20 into the axial cavity 11, during the assembly step of the cap 100.

The rubber 20 preferably has a length comprised between about 2.45 mm and 10.7 mm, more preferably a length comprised between 4.2 and 8.9 mm and a hardness comprised between 45 Shore A and 75 Shore A. Naturally, the dimension and hardness of the rubber are only indicative and may vary as the plastic material of which it is made varies.

Figure 8:
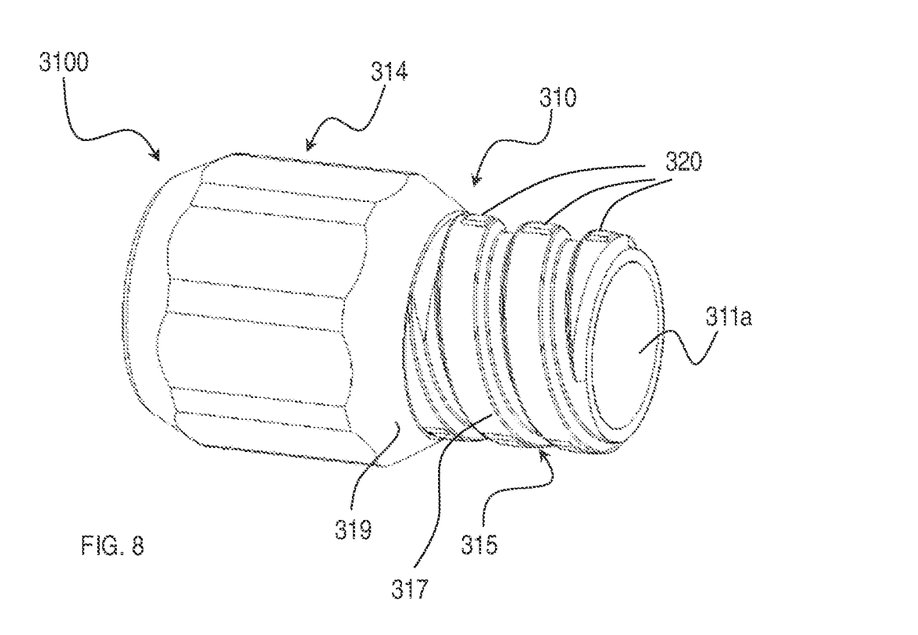
FIG. 8 is a perspective view of a cap according to still another alternative embodiment of the present invention.

In the assembled condition of the cap 100, shown in detail in FIG. 8, the surface 21 of the rubber 20 abuts against the flat, rigid bottom surface 13 of the axial cylindrical cavity 11 of the main body 10 and the side surface 23 is in contact with the side surface 12 of the inner axial cylindrical cavity 11 of the main body 10. The flat surface 22 of the rubber 20 is instead designed to abut, in use, against the free end 3a of the tip 3 of the pre-filled syringe 1.

Alternatively, instead of being flat, the surface 22 of the rubber 20 designed to abut, in use, against the free end 3a of the tip 3 of the pre-filled syringe 1 can be convex, with convexity facing the tip 3. In this case, as the cap is screwed onto the syringe, the convex surface 22 of the rubber 20 flattens, thus abutting against the free end 3a of the pre-filled syringe 1, air-tightly closing the aperture thereof.

Figure 6:
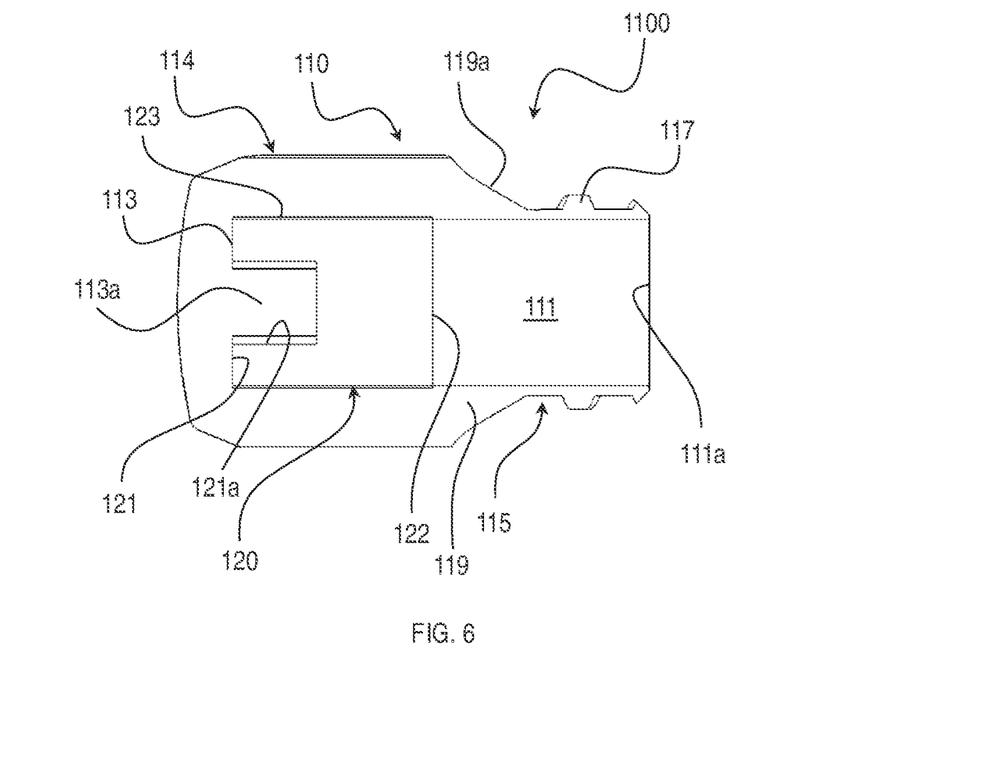
FIG. 6 is a front view and in longitudinal section of a cap according to an alternative embodiment of the present invention.

With reference to FIG. 6, a cap for the air-tight and unintentional anti-unscrewing closure of a pre-filled syringe with a Luer-lock connector according to an alternative embodiment of the present invention is shown.

The cap, generally indicated with the reference number 1100, is quite similar to the cap 100 described above and illustrated with reference to FIGS. 3 to 5, from which it differs due to the different configuration of the rubber and of the cylindrical axial cavity of the body main, different configurations which advantageously allow a better coupling between the rubber and the cavity within which it is housed.

The cap 1100 therefore comprises a rigid main body 110, substantially cylindrical and including a first handle portion 114, a second screwing portion 115, provided with outer threading 117, and a tapered portion 119, which is interposed between the first handle portion 114 and the second coupling portion 115. An axial cylindrical cavity 111, provided with an aperture 111a at the second coupling portion 115 and with a flat bottom surface 113 from which a pin 113a extends is also formed in the main body 110.

The tapered portion 119 is preferably frusto-conical with a linear or curved outer wall 119a.

The cap 1100 also comprises a rubber 120 housed within the axial cylindrical cavity 111 of the main body 110 and which has a surface 121 in which a seat 121a for housing the pin 113a, a flat or convex surface 122, with a convexity facing the aperture 111a of the axial cavity 111, and designed to abut against the free end 3a of the tip 3 of the pre-filled syringe 1, and a side surface 123 are formed.

Figure 7:
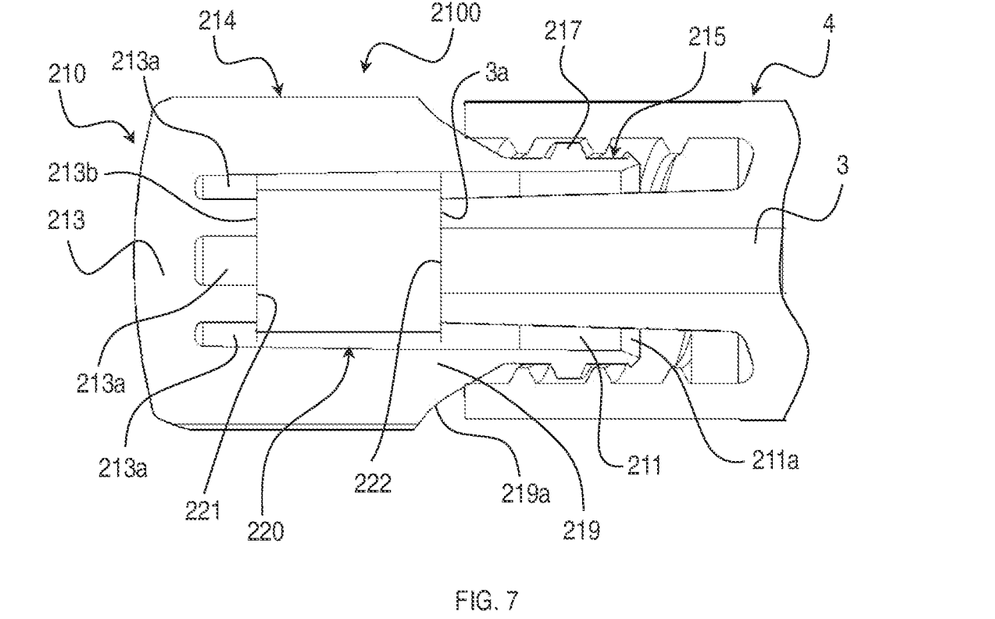
FIG. 7 is a front view and in longitudinal section of a cap according to still another alternative embodiment of the present invention, mounted on a pre-filled syringe with Luer-lock connector.

With reference to FIG. 7, a cap for the air-tight and unintentional anti-unscrewing closure of a pre-filled syringe with a Luer-lock connector according to still another alternative embodiment of the present invention is shown.

The cap, generally indicated with the reference number 2100, is quite similar to the cap 100 described above and illustrated with reference to FIGS. 3 to 5, from which it differs due to the different configuration of the axial cylindrical cavity of the main body.

The cap 2100 therefore comprises a rigid main body 210, substantially cylindrical and including a first handle portion 214, a second screwing portion 215, provided with outer threading 217, and a tapered portion 219, which is interposed between the first handle portion 214 and the second coupling portion 215. An axial cylindrical cavity 211, provided with an aperture 211a at the second coupling portion 215, is also formed in the main body 210.

The tapered portion 219 is preferably frusto-conical with a linear or curved outer wall 219a.

The cap 2100 further comprises a rubber 220 housed within the axial cylindrical cavity 211 of the main body 110 and which has a surface 221, a second 222, flat or convex surface with convexity facing the aperture 211a of the axial cavity 211 and designed to abut against the free end 3a of the tip 3 of the pre-filled syringe 1, and a side surface 223.

Recesses 213a are formed at an upper wall 213 of the main body 210, an abutment surface 213b of the surface 221 for the rubber 220 being delimited between said recesses 213a.

Figure 9:
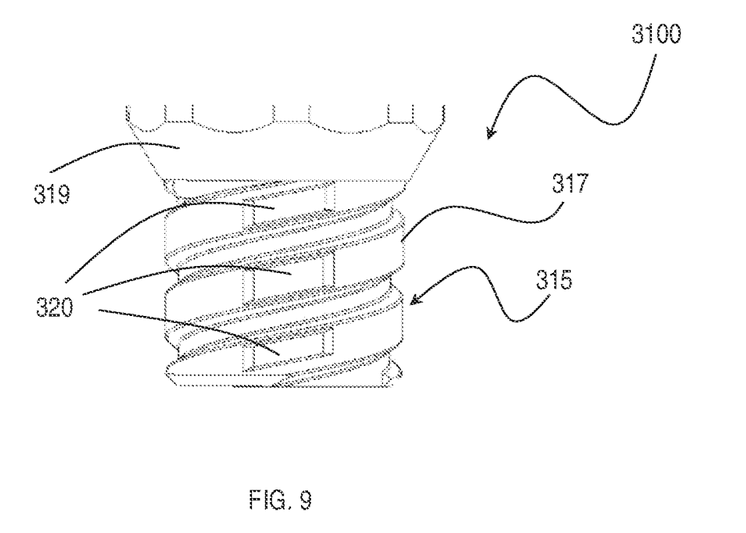
FIG. 9 is a front view with removed parts of the cap of FIG. 9.

With reference to FIGS. 8 and 9, a cap for the air-tight and unintentional anti-unscrewing closure of a pre-filled syringe with a Luer-lock connector according to still another alternative embodiment of the present invention is shown.

The cap, generally indicated with the reference number 3100, is quite similar to the cap 100 described above and illustrated with reference to FIGS. 3 to 5, from which it differs due to the different configuration of the second coupling portion.

The cap 3100 therefore comprises a rigid main body 310, which includes a first handle portion 314 and a second screwing portion 315, provided with outer threading 317 for matching with the inner threading 4a of the Luer-lock connector 4 of the pre-filled syringe 1.

The cap 3100 also comprises a tapered portion 319, which is interposed between the first handle portion 314 and the second coupling portion 315 and an axial cylindrical cavity, provided with an aperture 311a at the second coupling portion 315 is formed in the main body 310.

The cap 3100 also comprises a rubber (not visible in the Figures) housed within the axial cylindrical cavity of the main body 310 and having the same characteristics as the rubber 20 described above and illustrated with reference to FIGS. 3 to 5.

Raised elements 320, preferably with a rectangular extension, are formed at a crest portion of the threads of the outer threading 317, the function of these raised elements being to interact with the inner threading 4a of the Luer-lock connector 4. The raised elements 320 ensure, during the screwing step of the cap 3100 onto the Luer-lock connector 4 of the syringe 1, that a static and localized friction is generated between the raised elements 320 and the bottom portions of the corresponding threads of the inner threading 4a of the Luer-lock connector. This static friction advantageously prevents the cap 3100 from loosening under particularly extreme conditions, for example during the sterilization phase of the syringe 1 in an autoclave at a pressure of 4 bar, with consequent reduced tightness of the cap and penetration of air into the cylindrical body of the syringe 1.

In fact, this configuration of the threading 317 causes the interference between cap 3100 and Luer-lock connector 4 to be contained in a well-defined region, thus obtaining an effective anti-unscrewing effect and at the same time allowing the Luer-lock connector to elastically deform just enough to avoid cracks and breakages.

The operations of screwing and unscrewing the cap on the syringe are also facilitated. In fact, the contact forces between the cap and the Luer-lock connector do not persist for the entire duration of the screwing and unscrewing steps of the cap—that is, they are present in the final part of the screwing and in the initial part of the unscrewing. Furthermore, the contact forces between cap and Luer-lock connector are also generated at the raised elements 320.

Preferably, the second coupling portion 315 is conical with a taper equal to that of the Luer-lock connector 4 of the syringe 1.

Figure 10:
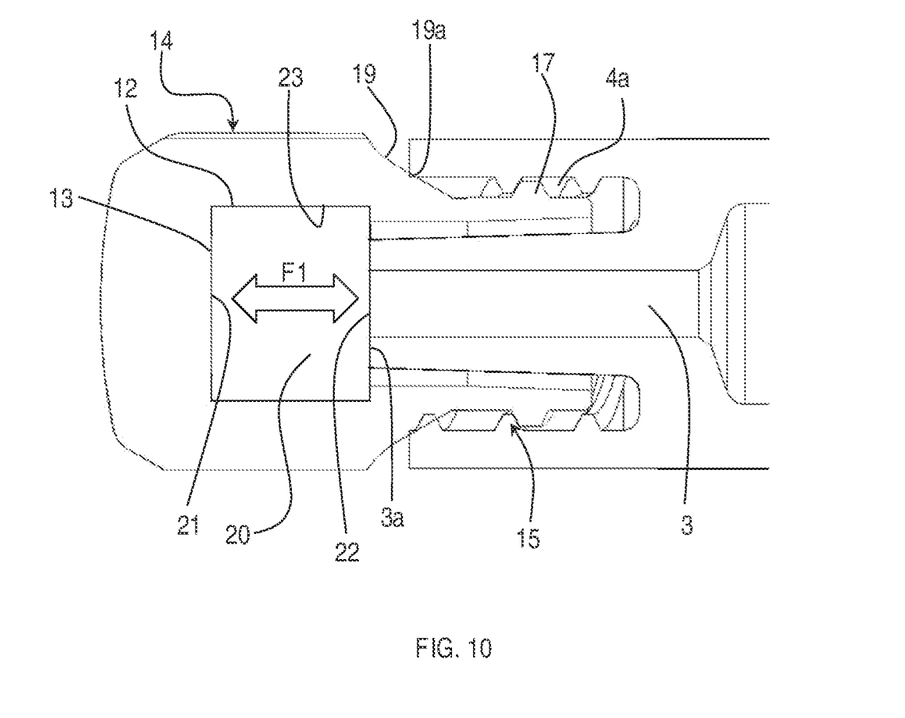
FIG. 10 is a front view and in longitudinal section of the cap of FIG. 3 mounted on a pre-filled syringe with Luer-lock connector.

With reference to FIG. 10, the sealing and unintentional anti-unscrewing action of the cap according to the invention when mounted onto the pre-filled syringe 1 is described below. In the following, reference will be made to the cap 100 shown in FIGS. 3 to 5, but it is understood that what has been said also applies to the cap 1100 shown in FIG. 6, to the cap 2100 shown in FIG. 7 and to the cap 3100 shown in FIGS. 8 and 9.

In the condition of mounting of the cap 100 on the pre-filled syringe 1, the second screwing portion 15 of the main body 10 is screwed onto the Luer-lock connector 4 by coupling the corresponding threadings 17 and 4a. The tapered portion 19 of the main body 10 is in abutment against the mouth of the Luer-lock connector 4, thus providing a mechanical abutment 19a and at the same time ensuring a suitable elastic deformation of the rubber 20. In fact, when the tapered portion 19 is in abutment against the Luer-lock connector 4, the rubber 20 has the flat surface 22 in abutment against the free end 3a of the tip 3 of the pre-filled syringe 1 and the surface 21 in abutment against the flat, rigid bottom surface 13 of the axial cylindrical cavity 11 of the main body 10. The rubber 20 is therefore suitably elastically compressed between the free end 3a of the syringe 1 and the bottom surface 13 of the main body 10 of the cap 100.

Under its compressed condition, the rubber 20 generates an appropriate elastic reaction force (arrow F1), which acts on the threaded coupling between the second coupling portion 15 and the Luer-lock connector, so that the threadings 4a, 17 of the Luer-lock connector 4 and of the cap 100 press between them, completely eliminating any clearance between the threads, thereby generating friction between them and therefore eliminating any possibility of unintentional unscrewing of the cap 100 from the pre-filled syringe 1. The friction is generated in particular between the sides of the threads 17 of the main body 10 of the cap 100 and the sides of the threads 4a of the Luer-lock connector 4 of the pre-filled syringe 1.

Furthermore, since the contact between rubber 20 and tip 3 of the pre-filled syringe is essentially frontal, that is, between the flat surface 22 of the rubber 20 and the free end 3a of the tip 3 of the pre-filled syringe 1, there are no frictions between the rubber 20 and outer surface of the tip 3. It follows that the operations of screwing and unscrewing the cap 100 by the operator are facilitated.

Under this mounted condition, the cap according to the invention achieves the desired air-tight and anti-unscrewing effect.

In fact, the tapered portion 19, in addition to air-tightly closing the space S between the Luer-lock connector 4 and the frusto-conical tip 3 of the syringe 1, guarantees the correct elastic deformation of the rubber 20. In turn, the rubber 20, in addition to air-tightly closing the free end 3a of the tip 3 of the syringe 1, due to the effect of the elastic deformation, increases the degree of coupling between the threads 4a and 17, of the Luer-lock connector 4 and of the second coupling portion 15, respectively, with an anti-unscrewing effect which is very similar to that obtained by inserting an elastic washer between screw and nut, tightening the latter.

The frictional force generated between cap 100 and pre-filled syringe 1 at the abutment 19a between the tapered portion 19 and the Luer-lock connector 4 also contributes to increasing the anti-unscrewing effect. In fact, when the user tightens the cap 100 on the Luer-lock connector 4 of the pre-filled syringe 1, a circumferential linear contact is generated between cap 100 and Luer-lock connector 4 at the abutment 19a. This linear contact leads to the generation of considerable pressures and therefore of frictional forces which counteract the unwanted unscrewing of the cap 100 from the pre-filled syringe 1.

Furthermore, the presence of the rubber 20 eliminates the anti-unscrewing effects due to thermal cycles and/or vibrations since the elastic material is able to absorb these effects, always guaranteeing an adequate elastic reaction force.

From the above description, the characteristics of the cap for a pre-filled syringe with Luer-lock connector, and of the pre-filled syringe comprising it, of the present invention are clear, as well as are the relative advantages.

Finally, it is clear that the cap as conceived herein is susceptible to many modifications and variations; furthermore, all the details are replaceable by technically equivalent elements. In practice, the materials used, as well as the dimensions thereof, can be of any type according to the technical requirements. For example, the cap and the cylindrical body of the syringe can be made of the same material, so as to advantageously have the same thermal expansion coefficient. Furthermore, although the conical shape of the cap has been described with reference to the embodiment thereof shown in FIGS. 8 and 9, it is possible to envisage a conical cap also in the other embodiments described herein.

The invention claimed is:

1. A cap for a pre-filled syringe with a Luer-lock connector comprising: a main body provided with a first handle portion and a second portion configured to be coupled to said Luer-lock connector, an axial cavity having an aperture at said second coupling portion being formed in said main body; and a rubber housed within said axial cavity of said main body; wherein the cap comprises a tapered portion which is interposed between said first handle portion and said second coupling portion and is configured to air-tightly engage the Luer-lock connector, and said rubber has a surface facing the aperture of the axial cavity, said surface configured to abut against an open free end of a tip of the pre-filled syringe for air-tightly closing said open free end, wherein said rubber further comprises a series of longitudinal grooves formed in a side surface thereof.

2. A cap according to claim 1, wherein said tapered portion is frusto-conical with a linear or curved outer wall.

3. A cap according to claim 1, wherein the surface of the rubber facing the aperture of the axial cavity is plane or convex with convexity facing the aperture of the axial cavity.

4. A cap according to claim 1, wherein said main body is substantially cylindrical and is made of rigid, non-deformable material and said axial cavity comprises a side surface and a rigid bottom surface against which said rubber abuts.

5. A cap according to claim 4, wherein said rubber has a surface for abutting against said rigid bottom surface said axial cavity, said abutment surface being opposite to the surface facing the aperture of the axial cavity.

6. A cap according to claim 5, wherein a seat is formed in said abutment surface for housing a pin projecting from said bottom surface.

7. A cap according to claim 5, wherein recesses are formed at an upper wall of the main body, an abutment surface for the rubber being delimited between said recesses.

8. A cap according to claim 1, wherein said first handle portion has a faceted outer surface.

9. A cap according to claim 1, wherein said second coupling portion has an outer threading for matching with a corresponding inner threading of said Luer-lock connector of the pre-filled syringe.

10. A cap according to claim 9, wherein raised elements having a rectangular extension, are formed at the outer threading of the coupling portion.

11. A cap according to claim 1, wherein said second coupling portion has a conical mouth at a free end thereof.

12. A pre-filled syringe with a Luer-lock connector comprising a cap according to claim 1.

* * * * *